US012738728B2

(12) United States Patent
Kendzia, III et al.

(10) Patent No.: US 12,738,728 B2
(45) Date of Patent: Sep. 15, 2026

(54) SYSTEMS AND METHODS OF DECENTRALIZED CONTROL OF A STATIC TRANSFER SWITCH

(71) Applicant: ABB Schweiz AG, Baden (CH)

(72) Inventors: Thomas Anthony Kendzia, III, Richmond, VA (US); Bhaskar Reddy Nili, Bangalore (IN); Raj Kumar, Bangalore (IN); Veerakumar Bose, Richmond, VA (US); Liju Kallarackal, Richmond, VA (US); Balaji Appadurai, Bangalore (IN)

(73) Assignee: ABB Schweiz AG, Baden (CH)

( * ) Notice: Subject to any disclaimer, the term of this patent is extended or adjusted under 35 U.S.C. 154(b) by 36 days.

(21) Appl. No.: 18/531,305

(22) Filed: Dec. 6, 2023

(65) Prior Publication Data

US 2025/0192542 A1 Jun. 12, 2025

(51) Int. Cl.
*H02H 7/22* (2006.01)
*H02H 1/00* (2006.01)
*H02J 9/06* (2006.01)

(52) U.S. Cl.
CPC ............ *H02H 7/22* (2013.01); *H02H 1/0007* (2013.01); *H02J 9/06* (2013.01)

(58) Field of Classification Search
CPC . H02H 7/22; H02H 1/0007; H02J 9/06; H02J 3/007; H02J 9/068
See application file for complete search history.

(56) References Cited

U.S. PATENT DOCUMENTS 5,210,685 A * 5/1993 Rosa ........................ H02J 9/062 307/64
5,644,175 A * 7/1997 Galm ...................... H02J 9/061 307/64

(Continued)

FOREIGN PATENT DOCUMENTS

| | | | |
|---|---|---|---|
| EP | 2731230 | A1 | 5/2014 |
| EP | 3588735 | A1 | 1/2020 |
| WO | 2023/114669 | A1 | 6/2023 |

OTHER PUBLICATIONS

International Preliminary Report on Patentability for Application No. PCT/US2024/058591, dated Jun. 2, 2026, 10 pages.

(Continued)

*Primary Examiner* — Thienvu V Tran
*Assistant Examiner* — Muaamar Qahtan Al-Taweel
(74) *Attorney, Agent, or Firm* — McCarter & English, LLP

(57) ABSTRACT

A static transfer switch (STS) system for transferring power between power sources is provided. The STS system includes first and second alternate-current (AC) switch assemblies. The first AC switch assembly includes a first current interrupter, and a first controller configured to control the first current interrupter. The second AC switch assembly includes a second current interrupter, and a second controller configured to control the second current interrupter. The first AC switch assembly and the second AC switch assembly are in communication with one another and are each configured to monitor an output power to the load, the first power source, and the second power source and transfer power when disturbance is detected in the output power, the first power source, and/or the second power source.

20 Claims, 7 Drawing Sheets

(56) References Cited

U.S. PATENT DOCUMENTS

| | | | | |
|---|---|---|---|---|
| 6,292,379 | B1 * | 9/2001 | Edevold | H02J 9/06 363/71 |
| 7,265,458 | B2 * | 9/2007 | Edelen | H02J 9/062 307/65 |
| 7,400,066 | B2 * | 7/2008 | Tassitino, Jr. | H02J 9/062 307/46 |
| 2005/0207082 | A1 * | 9/2005 | Bosch | H02J 9/06 361/107 |
| 2009/0072623 | A1 | 3/2009 | Liao | |

OTHER PUBLICATIONS

International Search Report and Written Opinion for Application No. PCT/US2024/058591, dated Apr. 4, 2025, 13 pages.

* cited by examiner

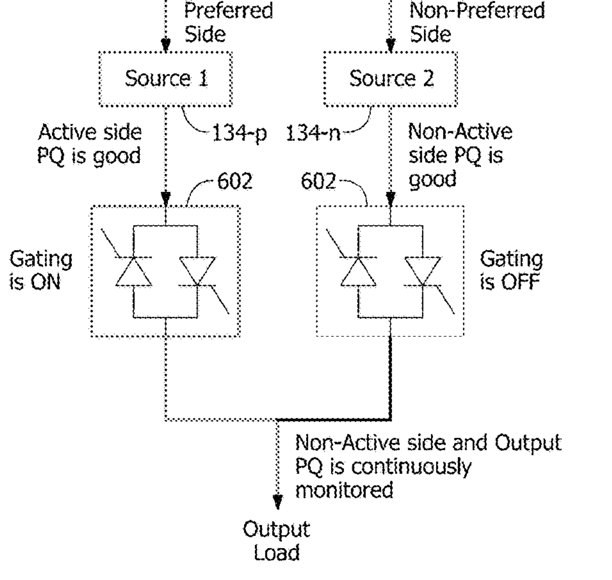
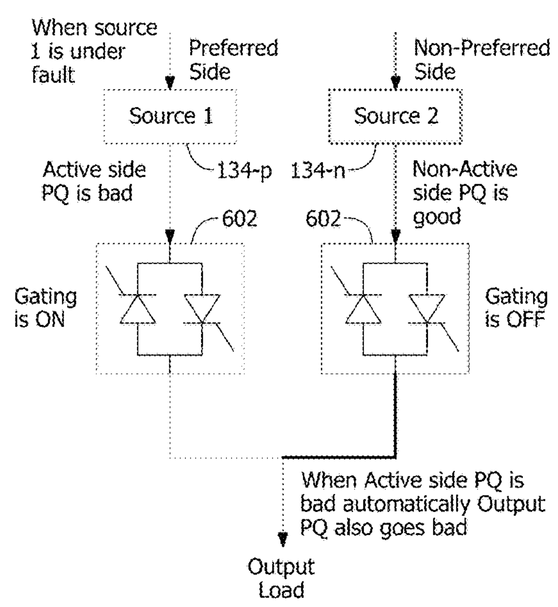
FIG. 6A
FIG. 6B

SYSTEMS AND METHODS OF DECENTRALIZED CONTROL OF A STATIC TRANSFER SWITCH

BACKGROUND

The field of the disclosure relates to electric power supply systems, and more particularly, to systems and methods of decentralized control of transferring power supply from one power source to another power source.

In mission critical environments, such as data centers, it is important that a back-up power source be available in case a primary power source is unavailable or degraded to a level unsuitable to power a load. Solid-state transfer switches or static transfer switches (STSs) are used to transfer from the primary power source to the back-up power source. As a result, STSs should have reliable performance in maintaining power supply to the load.

Known systems and methods of STSs are disadvantaged in some aspects and improvements are desired.

BRIEF DESCRIPTION

In one aspect, a static transfer switch (STS) system for transferring power between power sources is provided. The STS system includes a first alternate-current (AC) switch assembly and a second AC switch assembly. The first AC switch assembly includes a first current interrupter configured to connect a load to or disconnect the load from a first power source, and a first controller configured to control the first current interrupter. The second AC switch assembly includes a second current interrupter configured to connect the load to or disconnect the load from a second power source, and a second controller configured to control the second current interrupter. The first AC switch assembly and the second AC switch assembly are in communication with one another and are each configured to monitor an output power to the load, the first power source, and the second power source and transfer power when disturbance is detected in the output power, the first power source, and/or the second power source.

In another aspect, a method of operating an STS system for transferring power between power sources is provided. The STS system includes a first AC switch assembly. The first AC switch assembly includes a first current interrupter configured to connect a load to or disconnect the load from a first power source and a first controller configured to control the first current interrupter, the first AC switch assembly integrated into a module. The method includes electrically coupling the first AC switch assembly to the first power source and a load, and monitoring, via the first AC switch assembly, an output power to the load and the first power source. The method also includes transferring, via the first AC switch assembly, power when disturbance is detected in the output power and/or the first power source.

In one more aspect, an STS system for transferring power between power sources is provided. The STS system includes a first AC switch assembly including a first current interrupter configured to connect a load to or disconnect the load from a first power source, and a first controller configured to control the first current interrupter. The first controller is further configured to monitor an output power to the load and the first power source, and transfer power when disturbance is detected in the output power and/or the first power source. The first AC switch assembly is integrated into a first module.

DRAWINGS

Non-limiting and non-exhaustive embodiments are described with reference to the following Figures, wherein like reference numerals refer to like parts throughout the various drawings unless otherwise specified.

FIGS. 6A-6D show statuses of an example STS system during operation of power transfer.

DETAILED DESCRIPTION

The disclosure includes systems and methods of decentralized static transfer switch (STS) systems for transferring power from one power source to another power source. Method aspects will be in part apparent and in part explicitly discussed in the following description.

Figure 1:
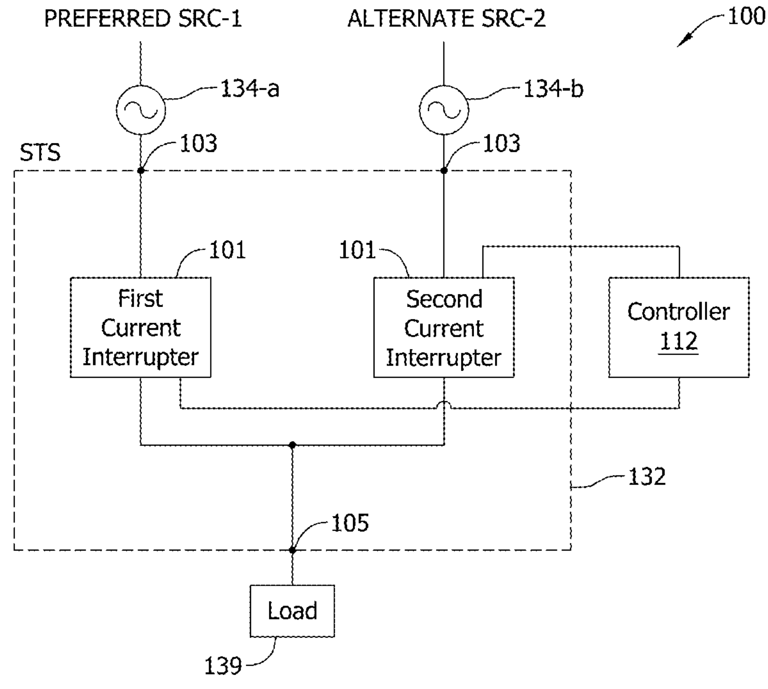
FIG. 1 is a schematic diagram of a known power system.

FIG. 1 shows a schematic diagram of a known power system 100 that includes a known static transfer switch 132. In power system 100, static transfer switch 132 includes a preferred input terminal 103, an alternate input terminal 103, and a load terminal 105. Preferred input terminal 103 is configured to receive electric power from a preferred voltage source 134-*a*. Alternate input terminal 103 is configured to receive electric power from an alternate volage source 134-*b*. The electric power from preferred voltage source 134-*a* and alternate volage source 134-*b* is in the form of an alternate current (AC) power. Power is supplied to a load 139 from load terminal 105. Static transfer switch 132 further includes a first current interrupter 101 and a second current interrupter 101. The first current interrupter 101 is electrically connected between preferred input terminal 103 and load terminal 105. First current interrupter 101 incudes one or more semiconductor switches such as thyristors. Second current interrupter 101 is electrically connected between alternate input terminal 103 and load terminal 105. Second current interrupter 101 also includes one or more semiconductor switches and may be implemented in a manner similar to first current interrupter 101.

System 100 further includes a controller 112. Controller 112 is electrically connected to first and second current interrupters 101. Controller 112 monitors the output voltage, source voltages of power sources, and the statuses of switches in static transfer switch 132, and configured to control the operation of first and second current interrupters 101. Static transfer switch 132 has a centralized architecture, where controller 112 controls the operation of both current interrupters 101. Typically, static transfer switch 132 is a stand-alone product and controller 112 is positioned separately from static transfer switch 132.

Centralized control is a potential single point of failure in system 100. Malfunction of controller 112 in any aspects of its performance renders the entire system 100 inoperable in delivering power to critical load 139. Before being used in the field for maintaining power supply to a critical load, static transfer switch 132 needs to be assembled with controller 112 in terms of hardware and software. Complicated wirings between static transfer switch 132 and controller 112 are required to provide electrical connections for control and operation of static transfer switch. 132. The complicated wirings and connections increase the time and labor to assemble system 100. Software is also needed to be programmed for the control and operation of static transfer switch 132 in the specific configuration. Due to the complexity and specialization of the hardware and software connections between controller 112 and static transfer switch 132, system 100 is not modular. To add or change static transfer switch 132, system 100 needs to be re-designed and re-constructed. Further, separately-positioned controller 112 needs space for a separate compartment for controller 112, increasing the footprint of system 100.

In contrast, the systems and methods described herein solve the above problems in known power systems. The control is integrated with the current interrupter of the power system, thereby decentralizing the control of the power system and eliminating the single failure point from the centralized control in known systems. The STS systems described herein are modular such that the STS system may be integrated into an existing switchgear system to replace a malfunctioning STS system or configured as an additional or stand-alone STS system readily to be connected with power supplies without additional hardware, reducing the complexity, costs, and labor of assembling. The modules of the STS system may be positioned at different locations, and are in communication with one another via wired or wireless communication, increasing the flexibility in configuring the power system. To change the configuration of a power system, only software changes are needed and the system does not need to be redesigned or rebuilt, simplifying system configuration.

Further, redundancy in control and fault handling is included in the systems and methods described herein, thereby increasing the reliability of the system. The AC switch assembly in an STS system described herein integrates a controller with a current interrupter. The AC switch assembly is self-aware, where the AC switch assembly monitors the power sources and the output power and controls the transfer from one power source to another to maintain power supply to the critical load. The AC switch assemblies in the STS system also communicate with one another. The communication adds one more layer of redundancy, and may be used to determine the status of the AC switch assemblies and the power system. The configuration of the STS system described herein increases the reliability of the power system while increasing the flexibility in system configuration.

Figures 2A, 2B:
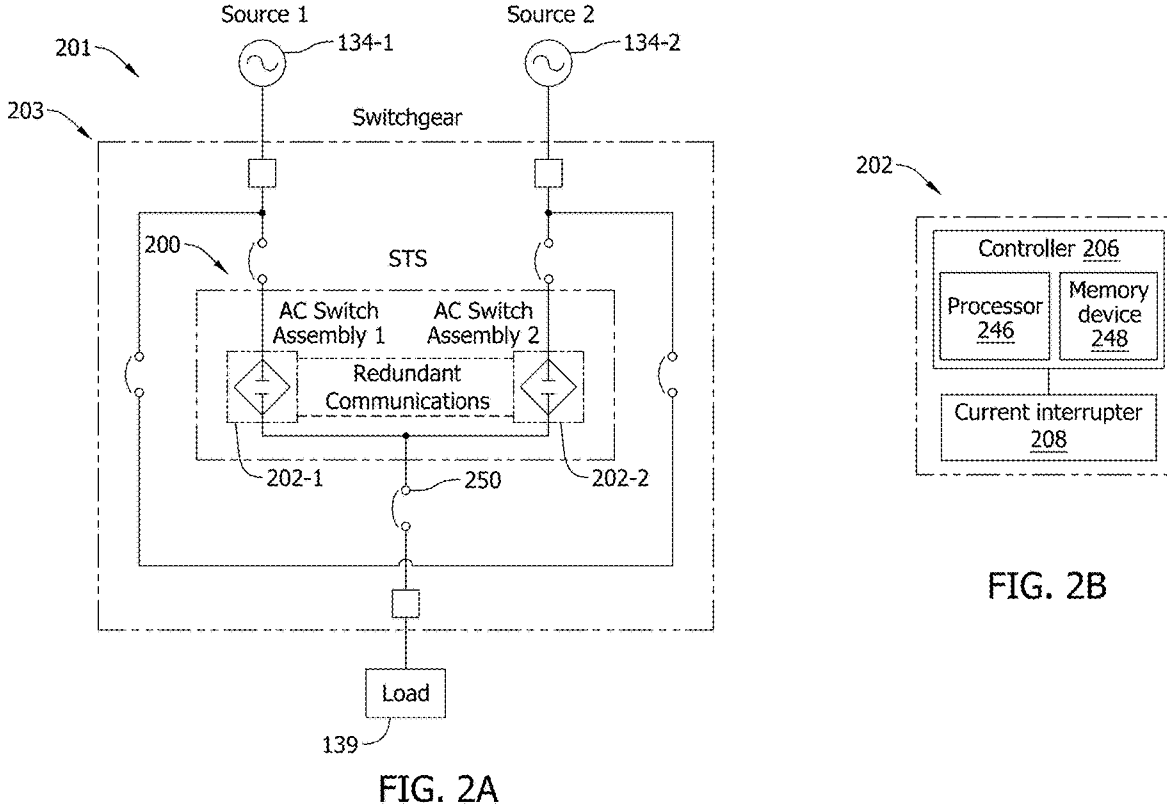
FIG. 2A is a schematic diagram of an example power system.
FIG. 2B is a schematic diagram of an alternate current (AC) switch assembly used in the power system shown in FIG. 2A.

FIGS. 2A and 2B show a power system 201 that includes an example STS system 200. FIG. 2A is a schematic diagram of power system 201. In the example embodiment, power system 201 includes a switchgear system 203. Switchgear system 200 is configured to be electrically coupled to a first power source 134-1 and a second power source 134-2. Switchgear system 203 controls the supply of power from power source 134-1 or 134-2 to load 139. Besides STS system 200, switchgear system 203 includes circuit breakers 250 and other components for managing the power supply and providing protection to load 139. STS system 200 is modular and is configured to be integrated with an existing switchgear system 200. Two power sources 134 are depicted in FIG. 2A as an example for illustration purposes only. The number of power sources 134 may be any number, such as one or three, that enable switchgear system 203 and STS system 200 to function as described herein.

In the example embodiment, STS system 200 includes a first alternate current (AC) switch assembly 202-1. STS system 200 may further include a second AC switch assembly 202-2. Each AC switch assembly 202 monitors all power sources 134 and the output power to load 139 and configured to connect a power source 134 to load 139 or disconnect the power source 134 from load 139. AC switch assemblies 202 communicate with one another. The number of AC switch assemblies may correspond to the number of power sources 134 to which power system 201 is connected.

A single line diagram of STS system 200 is depicted in FIG. 2A as an example for illustration purposes only, where power source 134 is one phase of an AC power source. Power source 134 may be a DC power source.

FIG. 2B is a schematic diagram of example AC switch assembly 202. In the example embodiment, AC switch assembly 202 includes a controller 206 and a current interrupter 208. Current interrupter 208 is configured to connect load 139 to or disconnect load 139 from power source 134. Current interrupter 208 may include semiconductor switches, such as thyristors arranged in anti-parallel with one another. Other circuitry, such as an auxiliary unit, may be included in current interrupter 208 to improve the performance of current interrupter 208. Operation of current interrupter 208 is controlled by controller 206.

In the example embodiment, controller 206 includes a processor-based microcontroller including a processor 246 and a memory device 248 wherein executable instructions, commands, and control algorithms, as well as other data and information needed to satisfactorily operate STS system 200, are stored. Memory device 248 includes instructions that when executed by processor 246 enable controller 206 to control operation of current interrupter 208. In some embodiments, memory device 248 may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based" microcontroller shall refer not only to controller devices including a processor or microprocessor as shown, but also to other equivalent elements such as microcomputers, programmable logic controllers, reduced instruction set circuits (RISC), application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based."

In some embodiments, AC switch assembly 202 may be located separately from another AC switch assembly 202. AC switch assembly 202 may be positioned remotely from another AC switch assembly 202. AC switch assemblies 202 may communicate with one another via wired or wireless communication such as wi-fi, Bluetooth, and/or Internet. AC switch assembly 202 may be positioned at a location with an access to the corresponding power source 134. Alternatively, AC switch assembly may be packaged with the corresponding power source 134. In one example, first AC switch assembly 202 is integrated into a module. Second AC switch assembly 202 may be integrated into a separate module. The modules may be positioned separately from one another and communicate with one another via wired or wireless communication mechanisms.

The form factors of the systems described herein are reduced by integrating the control with the current interrupter. The costs and labor of assembling are reduced by eliminating the complicated wirings between the control and the STS in known systems.

In the example embodiment, STS system 200 is modular with terminals for connecting to other components in switchgear system 203 or to power sources 134 and load 139 (see FIG. 3 described later). STS system 200 may be packaged as one single unit. STS system 200 may include one or more AC switch assemblies 202. AC switch assemblies 202 may be configured as modules inside STS system 200. A modular configuration of STS system is advantageous in reducing costs in assembling and increasing the flexibility in configuring the switchgear system and the power system.

Figure 3:
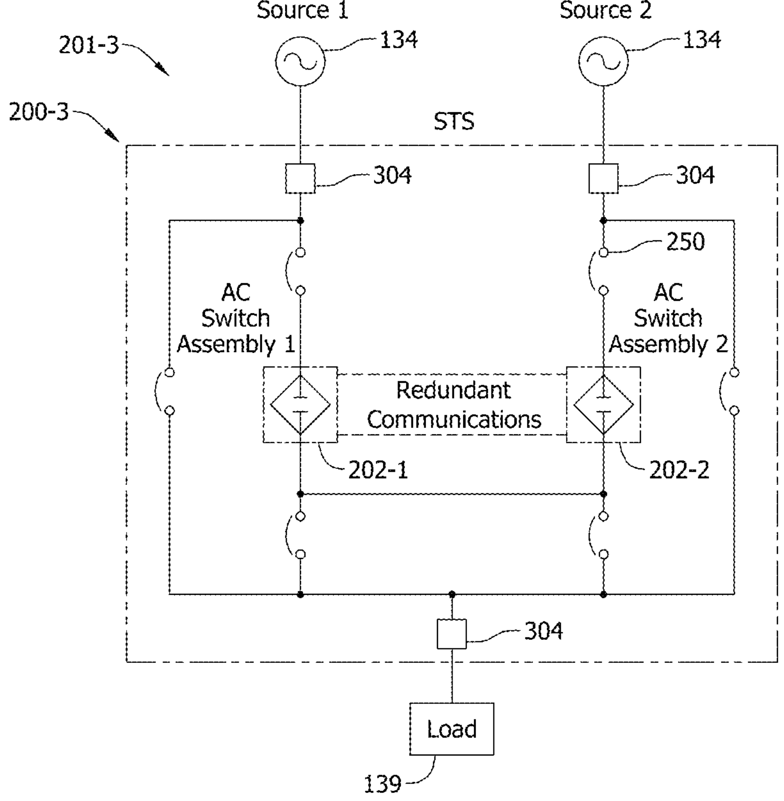
FIG. 3 is a schematic diagram of another example power system.

FIG. 3 is a schematic diagram of power system 201-3 that includes another example STS system 200-3. Compared to STS system 200 shown in FIG. 2A, where STS system 200 is configured to be integrated into an existing switchgear system 203 and replace a pre-existing STS system, STS system 200-3 is configured to function as a stand-alone power supply system. STS system 200 is configured to be directly electrically connected to power sources 134 and load 139. STS system 200-3 is configured to function as a stand-alone STS system to transfer power between power sources 134. In some embodiments, STS system 200-3 is configured to function as a stand-alone system to be integrated into a UPS system.

In the example embodiment, STS system 200 further includes circuit breakers 250 configured to protect STS system 200 against overcurrent and/or short circuit conditions. STS system 200 may further include other components 304 such as converters or transformers such that desired output power is supplied to load 139. Other components may also be included in STS system 200, such as contactors and/or power distribution blocks, that enable STS system 200 to function as described herein.

Besides integrating control with a current interrupter, measures are implemented to further increase the reliability and flexibility of the system. In one example, the load is ensured to be protected from conditions such as fault or overcurrent. The transfer of power from one power source to another is performed when needed. For example, when power quality of the active power source is unsatisfactory, the power source is transferred. A power source is active when the power source is connected to the load. The power quality of a power source is good or satisfactory when the power source meets the requirements of the load and a disturbance is not detected in the power source. The requirements of a load may be the power requirement, voltage requirement, current requirement, or any other requirements on the power from a power source for the load to operate. A disturbance may be a fault condition. A fault condition may be a source control board failure or a communication loss fault, where loss in source communication occurs. During a communication fault, the master AC switch assembly handles transfer based the output power quality. A fault condition may be a gate fault or a SCR (silicon-controlled rectifier)/thyristor fault such as an open SCR fault, a shorted SCR fault, or a SCR stuck-bit fault. Upon detection of a gate fault, the AC switch assemblies provide gate fault handling. A fault condition may be an overload condition such as a RMS (root-mean-square) overload fault or a peak current overload fault. Upon detection of an overload condition, the AC switch assemblies provide overload fault handling.

Systems and methods described herein include an AC switch assembly to control switches to connect or disconnect a power source when needed. The statuses of the system and power quality of the power sources and the output power are monitored by the AC switch assembly and are used to determine whether a transfer is needed. The AC switch assembly monitors the statuses and power quality and controls the operation on its own, unlike in known power systems, where the operation relies on the communication with the centralized control. In performing a transfer, the AC switch assembly controls the disconnection from the active power source and connection to an non-active power source after the disconnection to ensure power sources are not crossed and only one power source is supplied to the load at a given time, thereby protecting the load from excess power.

The switches in a current interrupter may be a single failure point in the system. Instead of duplicating switches or switch drives, which increases the costs, form factors, and complexity of the power system, systems and methods described herein include an AC switch assembly that detects the failure in the switches by monitoring the power sources and output power, thereby eliminating critical dependency of the system on switches. As a result, if switches fail, the failure is detected and remedial measures is provided such as connecting to a different power source and communicating the failure to request replacement or repair.

Systems and methods described herein facilitate hot swapping of AC switch control modules, where the swapping of roles of being master/slave switch assemblies is performed without disconnection of any AC switch assembly. At start-up, AC switch assembly 202 is self-aware and gain the master-slave role based on the communication. Each AC switch assembly 202 has control and fault management of STS system 200, providing the redundancy at the module level, instead of being at the component level. Each AC switch assembly 202 is configured to monitor the output power and the power sources, and transfer power from one source to another when disturbance is detected in the output power and/or the power sources. As a result, the reliability of the system is increased, without significant increase in costs from duplicated modules.

The controllers of AC switch assemblies communicate with one another, increasing the reliability of the system. The controller of each AC switch assembly is self-aware, where the controller monitors the statuses and power quality of the power sources and the output power. The controller of each AC switch assembly directly monitors the power quality of the power source of the corresponding power source to which the AC switch assembly connects, and directly monitors the output power because the AC switch assembly connects to the load. The power quality of other power sources is acquired from communications or implied by failure in communication from other AC switch assemblies when other AC switch assemblies are malfunctioning. For example, if the power quality of one power source is good, the status is communicated to AC switch assemblies for other power sources. On the other hand, if the power quality of this one power source is not good, the status may be communicated or may not be communicated if the AC switch assembly for this one power source is malfunctioning. Based on the communication or the fact of lacking in communication, other AC switch assemblies may determine that this one power source is not good and may initiate power transfer based on the power quality of the output power, without waiting for commands from centralized control like in known systems.

In some embodiments, STS system 200 includes one single AC switch assembly 202. When STS system 200 includes one single AC switch assembly 202, STS system 200 may be configured as a back-up system of a uninterruptible power system (UPS) and AC switch assembly 202 serves a bypass switch of the UPS system. A UPS system includes an inward output, which is controlled by an inverter. When the inward output has disturbance or unavailable, STS system 200 serves as a bypass and maintains output power to load 139.

Figure 4:
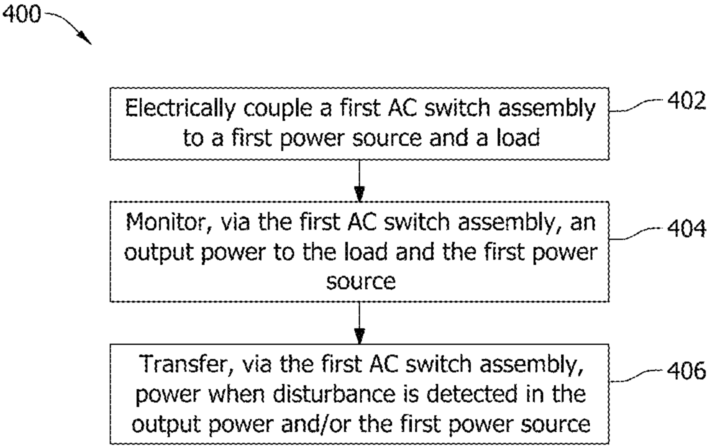
FIG. 4 is a flow chart of an example method of operating the static transfer switch (STS) systems shown in FIGS. 2A-3.

FIG. 4 is a flow chart of an example method 400 of operating a STS system. Example STS systems may be STS systems 200 described herein. In the example embodiment, method 400 includes electrically coupling 402 a first AC switch assembly to a first power source and a load. Method 400 also includes monitoring 404, via the first AC switch assembly, an output power to the load and the first power source. Method 400 further includes transferring 406, via the first AC switch assembly, power when disturbance is detected in the output power and/or the first power source.

Figure 5:
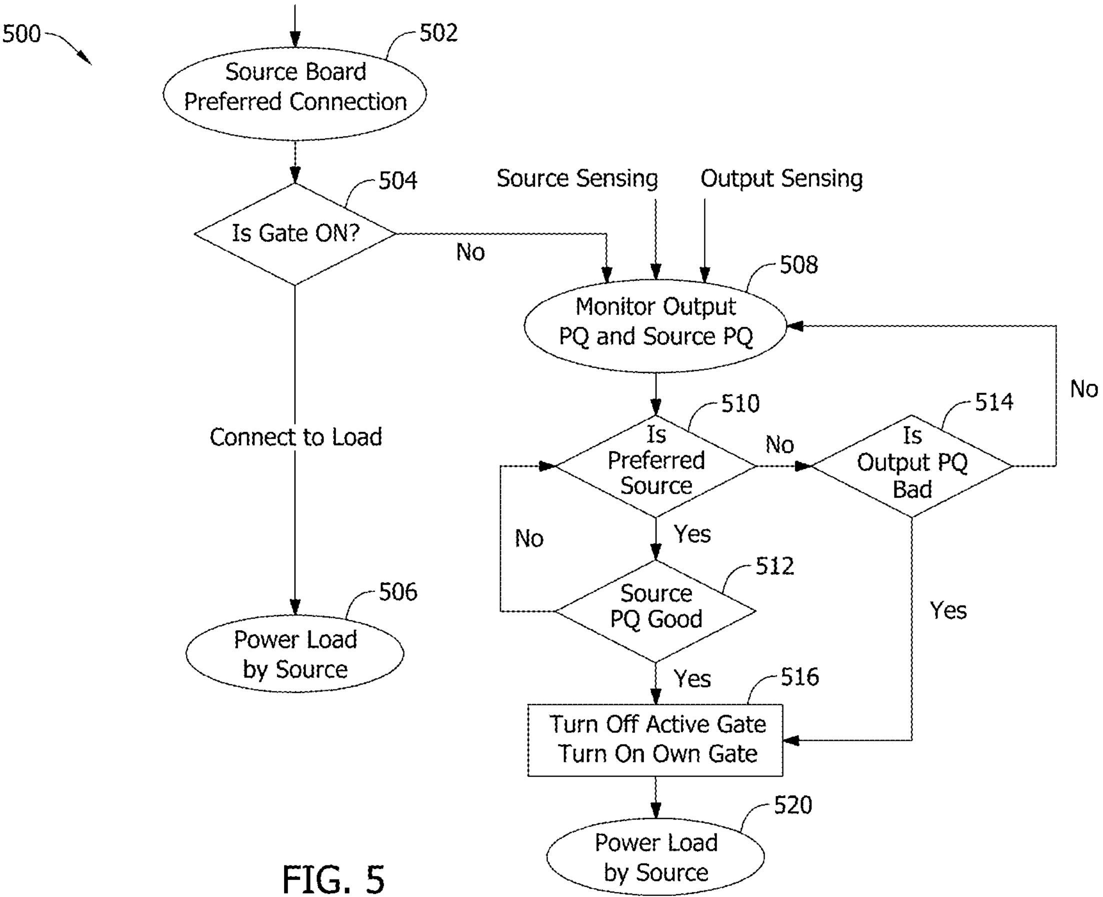
FIG. 5 is an example decision tree used in operating the STS systems shown in FIGS. 2A-3.

FIG. 5 is a diagram of a decision tree 500 in operating STS system 200. In the example embodiment, a preferred power source 134-*p* and an non-preferred power source 134-*n* are available (see FIGS. 6A-6D described later). One of AC switch assemblies may serve as a master AC switch assembly and other AC switch assemblies serve as slave switch assemblies. The master AC switch assembly controls the operations of current interrupters 208 and manages faults in STS system 200. For example, the master AC switch assembly monitors the active power source, the non-active power source, and the output power, and transfers the power from the active power source to the non-active power source when disturbance is detected in the output power and/or the active power source. After the transfer, the statuses of the power sources are updated to reflect whether the specific power source is active or non-active. The slave AC switch assembly serves as a back-up AC switch assembly as long as the master switch assembly communicates with the salve AC switch assembly and manages the power quality of the output power to ensure the quality of the output power is good. When the slave AC switch assembly detects the master AC switch assembly is not communicating or the quality of the output power is not good despite the management by the master AC switch assembly, which indicates the master switch assembly is not operating properly, the slave AC switch assembly becomes the master AC switch assembly and controls the operation of the STS system. STS system 200 may set an AC switch assembly as a master AC switch assembly based on factors such as the configuration, internal faults, communication faults, or power quality of the output power and the power source to which the AC switch assembly 202 connects. AC switch assembly 202 corresponding to preferred power source 134-*p* may serve as the master AC switch assembly. AC switch assembly 202 corresponding to non-preferred power source 134-*n* may serve as the slave AC switch assembly.

In the example embodiment, at the start-up of power system, STS system 200 is connected 502 to a preferred power source 134-*p*. Whether the gate for preferred power source 134-*p* is on is determined 504. If the gate is on, power from the preferred power source is delivered 506 to the load. If the gate is off, output power and power sources are monitored 508. Whether the power source that the AC switch assembly is monitoring is a preferred power source is determined 510. If the source is a preferred power source, whether the power quality of the source is good is determined 512. If the quality of the preferred power source is good, the active gate is turned 516 off and the gate of the source is turned 516 on, connecting the load with the preferred power source. If the quality of the preferred power source is not good, decision tree 500 goes back to determining 510 whether the source is a preferred power source and select next a non-preferred power source 134-*n* (see FIGS. 6A-6D described later). Whether the quality of the output power is bad is determined 514. If the output power is bad, the active gate is turned 516 off and the gate for the non-preferred source is turned 516 on, supplying 520 power to the load. If the quality of the output power is good when the power source is non-preferred but not active, output power and source power is monitored while the preferred power source remains active.

In decision tree 500, if the power quality of preferred power source 134-*p* is good, preferred power source 134-*p* is a preferred power source to be used to supply power to load 139 unless the quality of the output power is bad or insufficient to meet the need of load 139. When the output power is bad, power supply is transferred from the preferred power source to an non-preferred power source. When power is supplied by an non-preferred power source 134-*n*, if STS system 200 determines that the quality of the preferred power source 134-*p* goes back to the desired quality, the power supply is transferred back to preferred power source 134. A preferred power source is preferred over a non-preferred power source due to reasons such as the stability or duration of the power source. For example, a preferred power source may be a power supply from a utility while a non-preferred power source is a power supply from power storage such as batteries, which has a limited life.

FIGS. 6A-6D further show the operation of STS system 200. In the example embodiment, in FIG. 6A, preferred power source 134-*p* supplies power to load 139 with the gating 602 of AC switch assembly 202 is turned on. The gating controls the operation of current interrupter 208. When the gating is on, current interrupter 208 connects power source 134 to load 139. When the gating is off, current interrupter 208 disconnects load 139 from power source 134. The power quality of preferred power source 134-*p* is good. The power quality of non-preferred power source 134-*n* is also good, and the gating of the AC switch assembly connected to the alternative source 134-*n* is turned off such that power is supplied from preferred power source 134-*p* when the power quality of preferred power source 134-*p* is good. Preferred power source 134-*p* is the active power source and non-preferred power source 134-*n* is the non-active power source. The power quality of the non-active side and the output power are monitored. The AC switch assembly may infer the power quality of the power source to which the AC switch assembly is not connected by examining the output power. If the power source is active and the power quality of output power is good, the power quality of the power source may be inferred as being good.

In the example embodiment, in FIG. 6B, fault is detected in preferred power source 134-*p*, which indicates the power quality of the active side is bad. In the meantime, the power quality of the non-active side continues to be good. The power quality of the output power is bad because the power quality of the active power source is bad. The statuses of the gating on either side indicated in FIG. 6B are before the transferring.

Figures 6C, 6D:
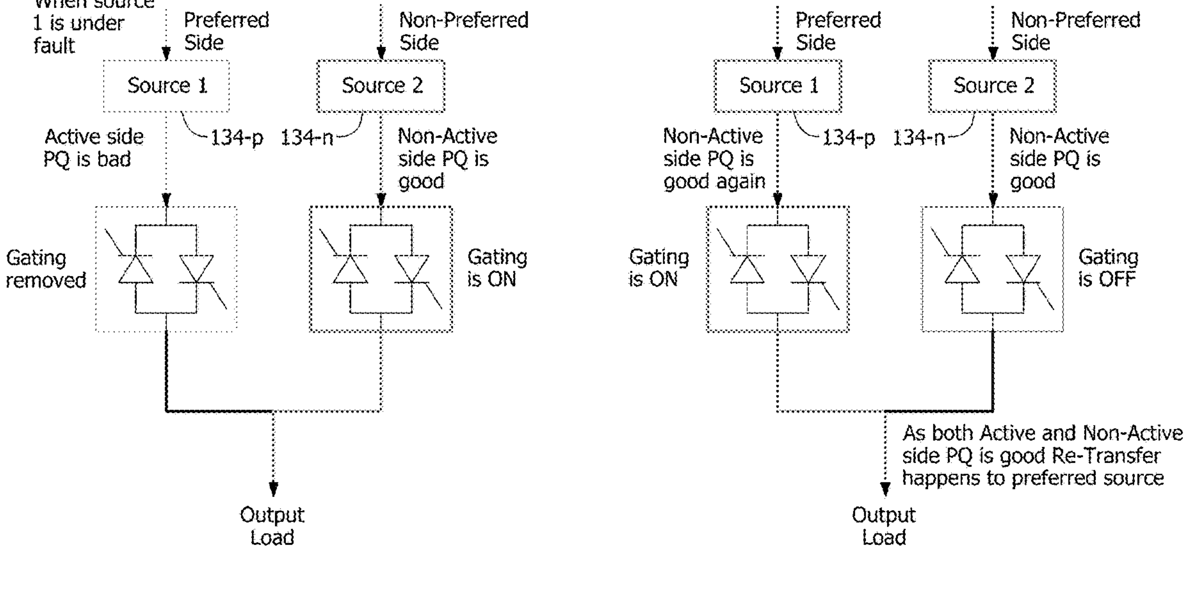

In the example embodiment, in FIG. 6C, because the output power is bad and the power quality of the non-active side is good, gating of the active side is turned off and the gating in the non-active side is turned on, facilitating the transfer of power supply to load 139 from preferred power source 134-*p* to non-preferred power source 134-*n*. While the non-preferred power source 134-*n* is connected and supplying power to load 139, the power quality of the preferred power source 134-*p* is continuously monitored by AC switch assemblies 202-1, 202-2 (see FIGS. 2A-3). During this period of time, remedy actions may be performed, such as closing circuit breakers and/or replacing fuses.

In the example embodiment, in FIG. 6D, when power quality of the preferred power source returns to be in a good condition, e.g., the fault condition having been remedied, transferring back to preferred power source 134-*p* is performed, where the gating 602 for the side of preferred power source 134-*p* is turned on and gating 602 for the side of non-preferred power source 134-*n* is turned off. While non-preferred power source 134 is not connected to load 139, the power quality of non-preferred power source 134 is monitored such that the power quality of non-preferred power source 134-*n* is good when a transfer to non-preferred power source 134-*n* is needed.

Two power sources are described in FIGS. 5-6D as example for illustration purposes only. STS system 200 may function as a bypass switch in a single AC switch configuration. For example, STS system 200 is connected to a non-active side source. The non-active side source may be set as the preferred power source. When the power quality of the non-active side source is good, STS system 200 transfers the power to the nonactive source. In some embodiments, STS system 200 is coupled with three or more power sources. One of the power sources is designated as preferred power source 134-*p* and other power sources are non-preferred power sources 134-*n*. The non-preferred power sources 134-*n* may have preference statuses ranked such that the non-preferred power source having the highest preference ranking is connected to supply power to load 139 when preferred power source 134-*p* is unavailable.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), an application specific integrated circuit (ASIC), and other programmable circuits, and these terms are used interchangeably herein. In the embodiments described herein, "memory" may include, but is not limited to, a computer-readable medium, such as a random-access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a programmable logic controller (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are not intended to limit in any way the definition and/or meaning of the term processor and processing device.

At least one technical effect of the systems and methods described herein includes (a) a modular STS system; (b) a STS system that includes an AC switch assembly configured to monitor and control the power transfer of sources; (c) a STS system that includes any number of AC switch assemblies; and (d) a STS system that includes redundant control and fault management.

Exemplary embodiments of systems and methods of power transfer are described above in detail. The systems and methods are not limited to the specific embodiments described herein but, rather, components of the systems and/or operations of the methods may be used independently and separately from other components and/or operations described herein. Further, the described components and/or operations may also be defined in, or used in combination with, other systems, methods, and/or devices, and are not limited to practice with only the systems described herein.

As used herein, an element or step recited in the singular and proceeded with the word "a" or "an" should be understood as not excluding plural elements or steps, unless such exclusion is explicitly recited. Furthermore, references to "example" or "one example" of the present disclosure are not intended to be interpreted as excluding the existence of additional examples that also incorporate the recited features. Further, to the extent that terms "includes," "including," "has," "contains," and variants thereof are used herein, such terms are intended to be inclusive in a manner similar to the term "comprises" as an open transition word without precluding any additional or other elements.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A static transfer switch (STS) system for transferring power between power sources, the STS system comprising:

a first alternate-current (AC) switch assembly and a second AC switch assembly directly electrically connected to and in communication with each other, wherein the first alternate-current (AC) switch assembly comprises:

a first current interrupter configured to connect a load to or disconnect the load from a first power source; and a first controller, wherein the second AC switch assembly comprises:

a second current interrupter configured to connect the load to or disconnect the load from a second power source; and a second controller, wherein the first controller is configured to control the first current interrupter and the second current interrupter, directly monitor an output power to the load and the first power source, and monitor the second power source based on communication with the second AC switch assembly, wherein the second controller is configured to control the first current interrupter and the second current interrupter, directly monitor the output power to the load and the second power source, and monitor the first power source based on communication with the first AC switch assembly, and wherein each of the first AC switch assembly and the second AC switch assembly are configured to:

determine whether a disturbance is detected in the output power, the first power source, and/or the second power source; and initiate, utilizing the first current interrupter and the second current interrupter, power transfer between the first power source and the second power source, in response to determining that the disturbance is detected in the output power, the first power source, and/or the second power source.

2. The STS system of claim 1, wherein the first AC switch assembly is configured to:

transfer the power from the first power source to the second power source by:

disconnecting the first current interrupter from the load; and connecting the second current interrupter to the load after the first current interrupter is disconnected.

3. The STS system of claim 1, wherein the STS system comprises three or more AC switch assemblies.

4. A method of operating a static transfer switch (STS) system for transferring power between power sources, the STS system including a first alternate-current (AC) switch assembly and a second AC switch assembly directly electrically connected to and in communication with each other, the first AC switch assembly including a first current interrupter configured to connect a load to or disconnect the load from a first power source and a first controller, the second AC switch assembly including a second current interrupter configured to connect the load to or disconnect the load from a second power source and a second controller, the first AC switch assembly integrated into a module, the method comprising:

via the first controller, controlling the first current interrupter and the second current interrupter, directly monitoring an output power to the load and the first power source, and monitoring the second power source based on communication with the second AC switch assembly;

via the second controller, controlling the first current interrupter and the second current interrupter, directly monitoring the output power to the load and the second power source, and monitoring the first power source based on communication with the first AC switch assembly;

determining, via each of the first AC switch assembly and the second AC switch assembly, whether a disturbance is detected in the output power, the first power source, and/or the second power source; and initiating, via each of the first AC switch assembly and the second AC switch assembly, power transfer between the first power source and the second power source, in response to determining that the disturbance is detected in the output power, the first power source, and/or the second power source, utilizing the first current interrupter and the second current interrupter.

5. The method of claim 4, wherein transferring the power further comprises:

disconnecting the first current interrupter from the first power source; and connecting the second current interrupter to the second power source.

6. The method of claim 4, wherein the first power source is a preferred power source, the method further comprising:

electrically connecting, via the first AC switch assembly, the preferred power source with the load during a start-up of the STS system.

7. The method of claim 6, further comprising:

transferring the power from the preferred power source to a non-preferred power source when the disturbance is detected in the output power and/or the preferred power source;

monitoring the preferred power source and the output power; and transferring the power from the non-preferred power source to the preferred power source when a power quality of the preferred power source is acceptable.

8. The method of claim 4, wherein the first AC switch assembly is a master AC switch assembly, and the method further comprises:

monitoring, via the master AC switch assembly, an active power source, a non-active power source, and the output power; and transferring, via the master AC switch assembly, the power from the active power source to the non-active power source when the disturbance is detected in the output power and/or the active power source.

9. The method of claim 4 further comprising:

configuring the STS system as a bypass switch of an uninterruptible power supply (UPS) system by:

configuring the first AC switch assembly as a slave AC switch assembly of the UPS system.

10. The STS system of claim 1, wherein the STS system comprises one single AC switch assembly, and the first AC switch assembly is configured as a bypass switch of an uninterruptible power supply (UPS) system.

11. The method of claim 4, wherein the STS system comprises three or more AC switch assemblies.

12. The STS system of claim 1, wherein:

the first controller monitors a power quality of the second power source based on the communication with the second AC switch assembly, wherein the communication with the second AC switch assembly indicates whether the power quality of the second power source is acceptable and implies that the second AC switch assembly is malfunctioning by failure in communication from the second AC switch assembly, and the second controller monitors a power quality of the first power source based on the communication with the first AC switch assembly, wherein the communication with the first AC switch assembly indicates whether the power quality of the first power source is acceptable and implies that the first AC switch assembly is malfunctioning by failure in communication from the first AC switch assembly.

13. The method of claim 4, wherein:

the first power source is a preferred power source, and the first AC switch assembly electrically connects the preferred power source with the load during a start-up of the STS system.

14. The method of claim 13, wherein the first AC switch assembly is configured to:

transfer the power from the preferred power source to a non-preferred power source when the disturbance is detected in the output power and/or the preferred power source;

monitor the preferred power source and the output power; and transfer the power from the non-preferred power source to the preferred power source when a power quality of the preferred power source is acceptable.

15. The STS system of claim 1, wherein:

the first AC switch assembly serves as a master AC switch assembly and the second AC switch assembly serves as a slave AC switch assembly, and the master AC switch assembly monitors an active power source, a non-active power source, and the output power, and transfers the power from the active power source to the non-active power source when the disturbance is detected in the output power and/or the active power source.

16. The STS system of claim 15, wherein when the slave AC switch assembly detects the master AC switch assembly is not communicating or a power quality of the output power is not acceptable, the slave AC switch assembly serves as the master AC switch assembly that monitors the active power source, the non-active power source, and the output power, and transfers the power from the active power source to the non-active power source when the disturbance is detected in the output power and/or the active power source.

17. The STS system of claim 1, wherein the first AC switch assembly and the second AC switch assembly infer a power quality of the power sources to which the corresponding AC switch assembly is not connected by examining a power quality of the output power.

18. The method of claim 4 further comprising:

monitoring, via the first controller, a power quality of the second power source based on the communication with the second AC switch assembly, wherein the communication with the second AC switch assembly indicates whether the power quality of the second power source is acceptable and implies that the second AC switch assembly is malfunctioning by failure in communication from the second AC switch assembly; and monitoring, via the second controller, a power quality of the first power source based on the communication with the first AC switch assembly, wherein the communication with the first AC switch assembly indicates whether the power quality of the first power source is acceptable and implies that the first AC switch assembly is malfunctioning by failure in communication from the first AC switch assembly.

19. The method of claim 8, wherein the second AC switch assembly serves as a slave AC switch assembly, and wherein when the slave AC switch assembly detects the master AC switch assembly is not communicating or a power quality of the output power is not acceptable, the slave AC switch assembly serves as the master AC switch assembly that monitors the active power source, the non-active power source, and the output power, and transfers the power from the active power source to the non-active power source when the disturbance is detected in the output power and/or the active power source.

20. The method of claim 4, wherein the first AC switch assembly and the second AC switch assembly infer a power quality of the power sources to which the corresponding AC switch assembly is not connected by examining a power quality of the output power.

* * * * *